(12) United States Patent
Casement et al.

(10) Patent No.: US 9,414,119 B2
(45) Date of Patent: Aug. 9, 2016

(54) TELEVISION SCHEDULE SYSTEM WITH ACCESS CONTROL

(75) Inventors: Marcy Casement, San Jose, CA (US); Andrew Burgess, San Jose, CA (US); David Folker, Fremont, CA (US)

(73) Assignee: Rovi Guides, Inc., San Carlos, CA (US)

( * ) Notice: Subject to any disclaimer, the term of this patent is extended or adjusted under 35 U.S.C. 154(b) by 1043 days.

(21) Appl. No.: 13/281,101

(22) Filed: Oct. 25, 2011

(65) Prior Publication Data

US 2012/0039583 A1    Feb. 16, 2012

Related U.S. Application Data

(63) Continuation of application No. 10/898,025, filed on Jul. 23, 2004, now Pat. No. 8,245,250, which is a continuation of application No. 09/635,079, filed on Aug. 8, 2000, now abandoned, which is a continuation of application No. 09/343,311, filed on Jun. 30, 1999, now Pat. No. 6,144,401, which is a continuation of application No. 08/654,997, filed on May 29, 1996, now Pat. No. 5,969,748.

(51) Int. Cl.
| | |
|---|---|
| *H04N 9/80* | (2006.01) |
| *H04N 21/454* | (2011.01) |
| *H04N 5/445* | (2011.01) |
| *H04N 7/088* | (2006.01) |
| *H04N 7/10* | (2006.01) |
| *H04N 7/16* | (2011.01) |
| *H04N 21/41* | (2011.01) |

(Continued)

(52) U.S. Cl.
CPC ......... *H04N 21/454* (2013.01); *H04N 5/44543* (2013.01); *H04N 7/0882* (2013.01); *H04N 7/0887* (2013.01); *H04N 7/10* (2013.01); *H04N 7/163* (2013.01); *H04N 21/4135* (2013.01); *H04N 21/44213* (2013.01); *H04N 21/4532* (2013.01); *H04N 21/4751* (2013.01); *H04N 21/4753* (2013.01); *H04N 21/4755* (2013.01); *H04N 21/47211* (2013.01); *H04N 21/47214* (2013.01)

(58) Field of Classification Search
CPC .......... H04N 5/44543; H04N 5/44591; H04N 7/0882; H04N 7/0887; H04N 7/0884
USPC ....................................................... 386/261
See application file for complete search history.

(56) References Cited

U.S. PATENT DOCUMENTS

| | | |
|---|---|---|
| 2,700,065 A | 1/1955 | Evans |
| 2,851,550 A | 9/1958 | Searcy |

(Continued)

FOREIGN PATENT DOCUMENTS

| | | |
|---|---|---|
| AU | 2159288 | 3/1989 |
| EP | 0160545 | 11/1985 |

(Continued)

OTHER PUBLICATIONS

"A New Approach to Addressability," CableData product brochure, Cable Data, Sacramento, California, undated.

(Continued)

*Primary Examiner* — Thai Tran
*Assistant Examiner* — Jose Mesa
(74) *Attorney, Agent, or Firm* — Ropes & Gray LLP

(57) ABSTRACT

The present invention is directed to a television schedule system with a user interface which allows a user to control access to television programs by time, rating, content, and/or channel. Furthermore, the user may set a limit on pay-per-view (PPV) spending to limit the purchase of PPV programs.

15 Claims, 12 Drawing Sheets

(51) Int. Cl.
*H04N 21/442* (2011.01)
*H04N 21/45* (2011.01)
*H04N 21/472* (2011.01)
*H04N 21/475* (2011.01)

(56) References Cited

U.S. PATENT DOCUMENTS

| | | |
|---|---|---|
| 2,856,474 A | 10/1958 | Norris |
| 3,879,332 A | 4/1975 | Leone |
| 4,012,583 A | 3/1977 | Kramer |
| 4,015,139 A | 3/1977 | Cleary et al. |
| 4,079,419 A | 3/1978 | Siegle et al. |
| 4,081,753 A | 3/1978 | Miller |
| 4,081,754 A | 3/1978 | Jackson |
| 4,156,850 A | 5/1979 | Beyers, Jr. |
| 4,162,513 A | 7/1979 | Beyers, Jr. et al. |
| 4,163,254 A | 7/1979 | Block et al. |
| 4,167,658 A | 9/1979 | Sherman |
| 4,170,782 A | 10/1979 | Miller |
| 4,225,884 A | 9/1980 | Block et al. |
| 4,228,543 A | 10/1980 | Jackson |
| 4,246,495 A | 1/1981 | Pressman |
| 4,247,743 A | 1/1981 | Hinton et al. |
| 4,288,809 A | 9/1981 | Yabe |
| 4,305,101 A | 12/1981 | Yarbrough et al. |
| 4,321,593 A | 3/1982 | Ho et al. |
| 4,348,696 A | 9/1982 | Beier |
| 4,355,415 A | 10/1982 | George et al. |
| 4,390,901 A | 6/1983 | Keiser |
| 4,425,579 A | 1/1984 | Merrell |
| 4,429,385 A | 1/1984 | Cichelli et al. |
| 4,482,789 A | 11/1984 | McVey |
| 4,484,217 A | 11/1984 | Block et al. |
| 4,484,220 A | 11/1984 | Beetner |
| 4,488,179 A | 12/1984 | Kruger et al. |
| 4,488,764 A | 12/1984 | Pfenning et al. |
| 4,495,654 A | 1/1985 | Deiss |
| 4,510,623 A | 4/1985 | Bonneau et al. |
| 4,528,589 A | 7/1985 | Block et al. |
| 4,536,791 A | 8/1985 | Campbell et al. |
| 4,566,033 A | 1/1986 | Reidenouer |
| 4,573,072 A | 2/1986 | Freeman |
| 4,588,901 A | 5/1986 | Maclay et al. |
| 4,598,288 A | 7/1986 | Yarbrough et al. |
| 4,604,708 A | 8/1986 | Lewis |
| 4,605,964 A | 8/1986 | Chard |
| 4,605,973 A | 8/1986 | Von Kohorn |
| 4,620,229 A | 10/1986 | Amano et al. |
| 4,636,595 A | 1/1987 | Smock et al. |
| 4,647,735 A | 3/1987 | Sicher |
| 4,648,667 A | 3/1987 | Baumgart |
| 4,685,131 A | 8/1987 | Horne |
| 4,706,121 A | 11/1987 | Young |
| 4,718,107 A | 1/1988 | Hayes |
| 4,750,213 A | 6/1988 | Novak |
| 4,768,229 A | 8/1988 | Benjamin et al. |
| 4,807,023 A | 2/1989 | Bestler et al. |
| 4,809,393 A | 3/1989 | Goodrich et al. |
| 4,823,385 A | 4/1989 | Hegendorfer |
| 4,855,611 A | 8/1989 | Isobe et al. |
| 4,862,268 A | 8/1989 | Campbell et al. |
| 4,885,775 A | 12/1989 | Lucas |
| 4,888,796 A | 12/1989 | Olivo, Jr. |
| 4,890,320 A | 12/1989 | Monslow et al. |
| 4,890,321 A | 12/1989 | Seth-Smith et al. |
| 4,903,031 A | 2/1990 | Yamada |
| 4,930,158 A | 5/1990 | Vogel |
| 4,930,160 A | 5/1990 | Vogel |
| 4,994,908 A | 2/1991 | Kuban et al. |
| 4,995,078 A | 2/1991 | Monslow et al. |
| 5,001,554 A | 3/1991 | Johnson et al. |
| 5,021,916 A | 6/1991 | Hubbard |
| 5,033,085 A | 7/1991 | Rew |
| 5,038,211 A | 8/1991 | Hallenbeck |
| 5,045,947 A | 9/1991 | Beery |
| 5,046,125 A | 9/1991 | Takizawa |
| 5,051,837 A | 9/1991 | McJunkin |
| 5,053,797 A | 10/1991 | Samuels et al. |
| 5,053,884 A | 10/1991 | Kamijyo |
| 5,056,139 A | 10/1991 | Littlefield |
| 5,068,734 A | 11/1991 | Beery |
| 5,075,771 A | 12/1991 | Hashimoto |
| 5,151,789 A | 9/1992 | Young |
| 5,168,353 A | 12/1992 | Walker et al. |
| 5,168,372 A | 12/1992 | Sweetser |
| 5,168,375 A | 12/1992 | Reisch et al. |
| 5,172,111 A | 12/1992 | Olivo, Jr. |
| 5,189,608 A | 2/1993 | Lyons |
| 5,206,722 A | 4/1993 | Kwan |
| 5,210,611 A | 5/1993 | Yee et al. |
| 5,223,924 A | 6/1993 | Strubbe |
| 5,231,310 A | 7/1993 | Oh |
| 5,235,415 A | 8/1993 | Bonicel et al. |
| 5,247,364 A | 9/1993 | Banker et al. |
| 5,253,066 A | 10/1993 | Vogel |
| 5,253,067 A | 10/1993 | Chaney et al. |
| 5,260,778 A | 11/1993 | Kauffman et al. |
| 5,293,357 A | 3/1994 | Hallenbeck |
| 5,303,063 A | 4/1994 | Kim et al. |
| 5,317,391 A | 5/1994 | Banker et al. |
| 5,357,276 A | 10/1994 | Banker et al. |
| 5,371,795 A | 12/1994 | Vogel |
| 5,382,983 A | 1/1995 | Kwoh et al. |
| 5,384,910 A | 1/1995 | Torres |
| 5,396,546 A | 3/1995 | Remillard |
| 5,425,101 A | 6/1995 | Woo et al. |
| 5,434,678 A | 7/1995 | Abecassis |
| 5,446,488 A | 8/1995 | Vogel |
| 5,465,113 A | 11/1995 | Gilboy |
| 5,477,262 A | 12/1995 | Banker et al. |
| 5,485,221 A | 1/1996 | Banker et al. |
| 5,485,518 A | 1/1996 | Hunter et al. |
| 5,488,409 A | 1/1996 | Yuen et al. |
| 5,497,420 A | 3/1996 | Garneau |
| 5,517,254 A | 5/1996 | Monta et al. |
| 5,548,345 A | 8/1996 | Brian et al. |
| 5,550,575 A | 8/1996 | West et al. |
| 5,557,724 A | 9/1996 | Sampat et al. |
| 5,579,055 A | 11/1996 | Hamilton et al. |
| 5,583,560 A | 12/1996 | Florin et al. |
| 5,583,576 A | 12/1996 | Perlman et al. |
| 5,585,866 A | 12/1996 | Miller et al. |
| 5,589,892 A * | 12/1996 | Knee et al. .................. 725/43 |
| 5,592,551 A | 1/1997 | Lett et al. |
| 5,594,509 A | 1/1997 | Florin et al. |
| 5,621,456 A | 4/1997 | Florin et al. |
| 5,629,733 A | 5/1997 | Youman et al. |
| 5,657,414 A | 8/1997 | Lett et al. |
| 5,664,046 A | 9/1997 | Abecassis |
| 5,669,104 A | 9/1997 | Howie, Jr. |
| 5,731,844 A | 3/1998 | Rauch et al. |
| 5,751,335 A | 5/1998 | Shintani |
| 5,764,281 A | 6/1998 | Seo |
| 5,781,246 A | 7/1998 | Alten et al. |
| 5,822,123 A | 10/1998 | Davis et al. |
| 5,969,748 A | 10/1999 | Casement et al. |
| 6,144,401 A | 11/2000 | Casement et al. |
| 6,473,559 B1 * | 10/2002 | Knudson et al. .............. 386/291 |
| 8,006,260 B2 | 8/2011 | Leung et al. |
| 8,245,250 B2 | 8/2012 | Casement et al. |
| 2002/0095673 A1 | 7/2002 | Leung et al. |
| 2003/0194200 A1 * | 10/2003 | Yuen et al. .................. 386/46 |
| 2005/0125822 A1 | 6/2005 | Casement |
| 2008/0178210 A1 | 7/2008 | Casement |
| 2013/0014154 A1 | 1/2013 | Casement |

FOREIGN PATENT DOCUMENTS

| | | |
|---|---|---|
| EP | 0673583 | 9/1995 |
| EP | 1094665 | 4/2001 |
| EP | 1152605 | 11/2001 |
| FR | 2678091 | 12/1992 |
| GB | 2209417 | 5/1989 |
| GB | 2210526 | 6/1989 |

(56) References Cited

FOREIGN PATENT DOCUMENTS

| | | |
|---|---|---|
| GB | 2215928 | 9/1989 |
| JP | 61-052087 | 3/1986 |
| JP | 61-196405 A | 8/1986 |
| JP | 63-289619 A | 11/1988 |
| JP | 05-064192 A | 3/1993 |
| JP | 5122694 A | 5/1993 |
| JP | 05176320 A | 7/1993 |
| JP | 05-290439 A | 11/1993 |
| JP | 06-282345 A | 10/1994 |
| JP | 07046521 A | 2/1995 |
| JP | 07-67094 | 3/1995 |
| JP | 07-193756 A | 7/1995 |
| JP | 07-203411 A | 8/1995 |
| JP | 07231437 A | 8/1995 |
| JP | 08-018882 A | 1/1996 |
| JP | 08-116495 A | 5/1996 |
| KR | 1990-0005166 | 7/1990 |
| KR | 1994-0017774 | 7/1994 |
| WO | WO-8601962 | 3/1986 |
| WO | WO-8801465 | 1/1988 |
| WO | WO-8911199 | 11/1989 |
| WO | WO-8912370 | 12/1989 |
| WO | WO-9015507 | 12/1990 |
| WO | WO-9311638 | 6/1993 |
| WO | WO-9311639 | 6/1993 |
| WO | WO-9311640 | 6/1993 |
| WO | WO-9323957 | 11/1993 |
| WO | WO-9413107 | 6/1994 |
| WO | WO-9416441 | 7/1994 |
| WO | WO-9510916 | 4/1995 |
| WO | WO-9532583 | 11/1995 |
| WO | WO-9625821 | 8/1996 |

OTHER PUBLICATIONS

"Addressable Converters: A New Development at Cable Data," Via Cable, vol. 1, No. 12, Dec. 1981, Cable Data, Sacramento, California.
"Westar and Videotoken Network Present the CableComputer" (Plaintiff's Exhibit 334).
104 H. Rpt. 204 Communications Act of 199, Retrieved from the Internet, Jul. 24, 1995, pp. 1-4, XP002100790 http://roscoe.law.harvard.edu/courses/tech seminar96/course/sessions/ vonip/10.html, p. 2, paragraph 6-paragraph 7.
Brugliera, "Digital On-Screen Display—A New Technology for the Consumer Interface," Symposium Record Cable Sessions of the 18th International Television Symposium & Technical Exhibition, Jun. 1993, pp. 571-586.
CableComputer User's Guide, bearing a date of Dec. 1985 (Plaintiff's Exhibit 289).
CableData, Roseville Consumer Presentation, Mar. 1986.
Chiddix et al., "Off-Premises Broad-Band Addressability: A CATV Industry Challenge," American Television and Communications Corporation, Stamford Connecticut 1989 NCTA Technical Papers, 1989, pp. 57-64.
Committee on Commerce, "Communications Act of 1995," XP-002100790, Jul. 1995, pp. 1-4.
Dufresne, "New Services: An Integrated Cable Network's Approach, Videotron Communication LTEE," Technical Papers of NCTA 31st Annual Convention & Exposition, pp. 156-160 (1982).
Federal Communications Commission, In the Telecommunications Act of 1996, PuBlic Law 104-104, effective Feb. 8, 1996, in Section 551, "Parental Choice in Television Programming," XP-002100791, pp. 1-5.
Jerrold Communications Publication, "Cable Television Equipment," dated 1992 and 1993, pp. 8-2.1 to 8-6 and 8-14.1 to 8-14.3.
Libman, "Times Staff Writer Chaining the Channels, A New Generation of Television Blocking Systems Allows More Options for Parent, Seeking to Control Kids' Viewing," Aug. 9, 1993.
M/A-Com, Inc., "Videocipher II Satellite Descrambler Owner's Manual," dated prior to Feb. 1986.
Merrll et al., "An Auto-Dialer Approach to Pay-Per-View Purchasing," Zenith Electronic Corporation, Glenview, Illinois, 1989 NCTA Technical Papers, pp. 34-38.
Roseville City Council Presentation, bearing a date of Mar. 13, 1985 (Defendant's Exhibit 26).
Rzeszewski et al., "A Microcomputer Controlled Frequency Synthesizer for TV", Reprinted from *IEEE Trans. Consum. Electron.*, vol. CE-24, pp. 145-153 (1978).
Smart, "Innovative Aspects of a Switched Star Cabled Television Distribution System," British Cable Services Limited, 1987 NCTA Technical Papers, pp. 26-35.
StarSight Telecast Inc. User's Guide, pp. 1-20 (1994).
Two Cable TV companies in Canada, Development of apparatus for preventing violence video,Nikkei Electronics, Nikkei BP, Mar. 11, 1996, No. 657, p. 13-14.
Vaeth et al., Enertec, Inc., The Addressable Controller of the Future, General Instrument/Herrold Communications, 1990 NCTA Technical Papers, pp. 274-279.
Videocipher Owner's Manual, M/A-Com., Publication No. 4096-048; Model No. VC-2000E or VC-2000E/B, undated.
Walsh, Jr., Timing Considerations in RF Two Way Data Collection and Polling, Jerrold-Applied Media Lab, 1989 NCTA Technical Papers, pp. 47-56.
West et al., "Off Premises Technology Comparisons," Scientific Atlanta 1989 NCTA Technical Papers, 1989, pp. 39-56.
Uniden UST-4800-Super Integrated Receiver/Descrambler Preliminary Reference Manual, Published Nov. 12, 1991.
Advanced Television Systems Committee, "Program and System Information Protocol for Terrestrial Broadcast and Cable," Dec. 23, 1997 (95 pages).
European Patent 0 900 499 File History, Aug. 8, 2012-Mar. 14, 2014 (214 pages).
Hallenbeck Witness Statement Exhibits PDH1 through PDH35 dated Sep. 30, 2012 (492 pages).
ITC Inv. No. 337-TA-845: Expert Report of Peter D. Hallenbeck filed Dec. 13, 2012 (182 pages).
Melton, "The Uniden Super 4800," OnSat Magazine, Jun. 10-Jun. 16, 1990 (4 pages).
*Rovi v. Virgin Judgment*, Trial dated Mar. 26, 2014, case No. HC11C04556 (82 pages).
Sony Corporation, "Digital Satellite Receiver Operating Instructions", 1995 (92 pages).
*Starsight Telecast v. Virgin Media*, Feb. 28, 2014, Proceedings Day 2 (66 pages).
SuperGuide/Uniden 4800, "A Quick Guide to Programming the Uniden 4800—Dealer Set-Up Manual," undated (8 pages).
SuperGuide/Uniden 4800, "A User's Guide to SuperGuide's™ Features," undated (12 pages).
Uniden®, UST-4800, Integrated Receiver/Descrambler, Installation Guide, copyright 1990 (60 pages).
Uniden®, UST-4800, Integrated Receiver/Descrambler, Operating Guide, copyright 1990 (24 pages).

\* cited by examiner

TELEVISION SCHEDULE SYSTEM WITH ACCESS CONTROL

CROSS REFERENCE TO RELATED APPLICATIONS

This application is a continuation of U.S. patent application Ser. No. 10/898,025, filed Jul. 23, 2004, currently pending, which is a continuation of U.S. patent application Ser. No. 09/635,079, filed Aug. 8, 2000, now abandoned, which is a continuation of U.S. patent application Ser. No. 09/343,311, filed Jun. 30, 1999, now U.S. Pat. No. 6,144,401, which is a continuation of U.S. patent application Ser. No. 08/654,997, filed May 29, 1996, now U.S. Pat. No. 5,969,748, and each of these previous applications are hereby incorporated by reference herein in its entirety.

BACKGROUND OF THE INVENTION

The present invention relates to a system for providing television schedule information, and more particularly to a television schedule information guide with capability for controlling access to television programs.

Systems are available for providing television schedule information to a user. For example, U.S. Pat. No. B1 4,706,121 (Young), provides a television schedule system and process. In one embodiment of Young; the television schedule information is provided on the user's television screen. The user may supply selection criteria which are utilized by the Young system to make program selections, and the like. In addition, Young discloses a system which controls a television receiver to allow for automatic selection of programs and the automatic, unattended recording of programs that are listed in the television schedule information guide. The automatic, unattended recording of programs is achieved by controlling a videotape recorder (VCR) or other recording device.

SUMMARY OF THE INVENTION

The present invention is directed to a television schedule system with a user interface that allows a user to control access to television programs by time, rating, content, and/or channel. Furthermore, the user may set a limit on pay-per-view (PPV) spending to limit the purchase of PPV programs.

In a preferred embodiment, the television schedule system has a main menu. A user may select the "Parental Control" (parental control) menu from the main menu to enter the parental password. The parental password may be established from the main menu. After establishing and entering the parental password, the user may lock-out programs by channel, by rating, content, and/or by time from the parental control menu. The content description of the show may further have a corresponding "V-chip" classification based on V-chip rating data supplied by the FCC. Hence, the user may further lock out programs by V-chip classification. In order to tune to a locked program, the parental password is preferably supplied.

In one embodiment, the user may select a "control viewing" menu from the main menu to enter a purchase password. The purchase password may also be established from the main menu. After establishing and entering the purchase password, the user may specify a PPV spending limit thereby limiting the purchase of PPV programs. The user may further specify the type of PPV programs allowed based on rating and content. In order to purchase beyond the spending limit, the purchase password is preferably supplied. In order to purchase restricted programs, both the parental and purchase passwords are preferably supplied.

If the user does not remember a password, the user may, for example, call the cable operator. The cable operator may set the password to null so the user may establish a new password.

Other features and advantages of the present invention will become apparent to those skilled in the art upon a perusal of the remaining portions of the specification and drawings. In the drawings, like reference numerals indicate identical or functionally similar elements.

DESCRIPTION OF PREFERRED EMBODIMENTS

Figure 1:
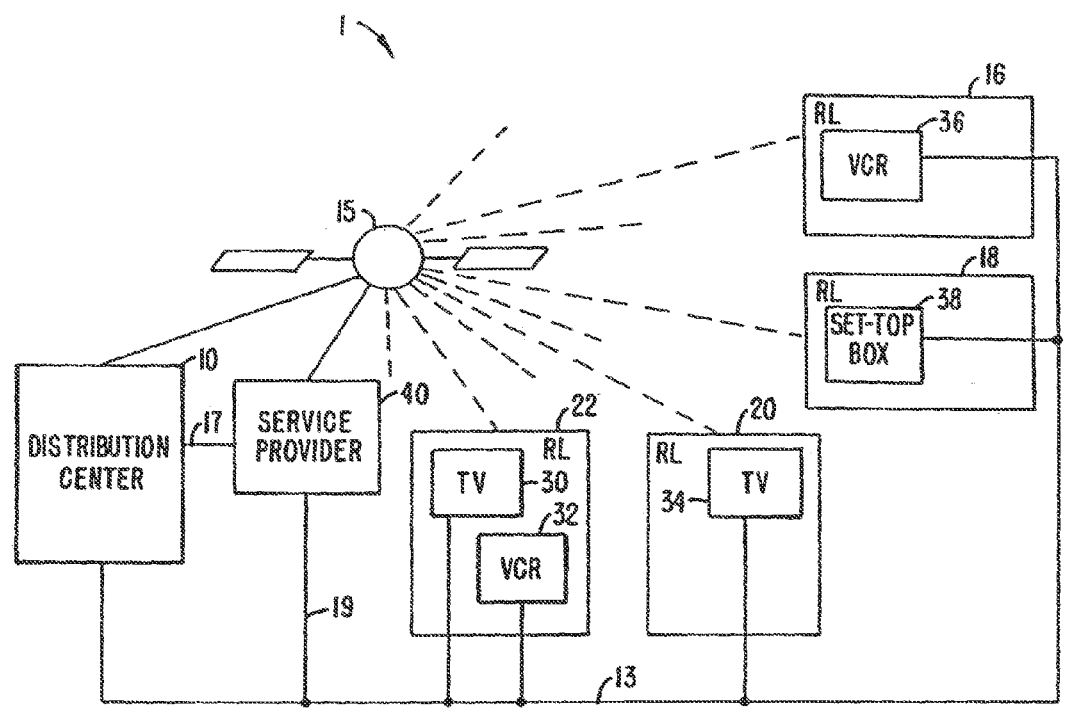
FIG. 1 illustrates a preferred embodiment of a television system according to the present invention.

The present invention provides a television (TV) schedule system with capability for controlling access to TV programs. FIG. 1 illustrates a preferred embodiment of TV system 1 in which the invention may be utilized. As shown, system 1 includes a distribution center 10 and multiple receiving locations. Distribution center 10 compiles data for a data-stream. In a preferred embodiment, this data-stream is broadcast to receiving locations 16, 18, 20, and 22. Several methods are available for broadcasting the data-stream from distribution center 10 to receiving locations 16-22. For example, satellite 15 may broadcast this data-stream within the vertical blanking interval (VBI) of a television channel (e.g., PBS) or a dedicated channel to receiving locations 16, 18, 20, and 22. Alternatively, the data may be broadcast out of band, i.e., using non channel specific mechanisms. In another embodiment, the data-stream is provided to receiving locations 16, 18, 20, and 22 via transmission line 13. Transmission line 13 may be, for example, optical fiber, coax cable, telephone line, or the like. In yet another embodiment, peripheral devices, which are located within the receiving locations, receive the data-stream from, for example, a local service provider 40. Service provider 40 receives the data-stream from distribution center 10 via line 17, and broadcasts the data-stream to the receiving peripheral devices via satellite 15 (or another satellite), or via lines 19 and 13. The receiving peripheral devices may be televisions 30, televisions 34, VCRs 32, VCRs 36, and/or set-top boxes 38. In still further embodiments, PCTVs may be utilized, or the data-stream may be provided to a personal computer for use with the computer and/or more of the above devices.

In the preferred embodiment, information in the data-stream includes TV schedule information. Software located within the peripheral devices utilize the schedule information provided in the data-stream to generate a TV schedule guide. The software is stored on a computer-readable storage medium 42 such as a ROM, RAM, disk, or other storage device. If the TV schedule guide is in a grid format, for example, the available channels may be listed on the "y" axis and various times may be listed on the "x" axis. The user may tune to a program within the TV schedule guide by highlighting the program within the guide, and selecting the program. The user may also select one or more desired programs which are listed in the TV schedule guide for automatic, unattended recording. For more information on how the TV schedule system displays information, and its tuning and automatic recording capabilities, see U.S. Pat. No. B1 4,706,121 and U.S. Pat. No. 5,151,789. Both these patents, like the present patent application, are assigned to StarSight Telecast, Inc., and are hereby incorporated by reference in their entirety for all purposes.

The system further has the capability of preventing viewers from tuning to or viewing one or more TV programs. TV programs may be blocked by channel, rating, content, and/or time. If the user turns on the TV during a locked time, or tunes to a channel with a show that contains the locked rating or content/V-chip classification (for example), the television schedule system mutes the audio and displays a solid blue screen over the TV screen. A pop-up will appear asking for the parental password. The solid blue screen will disappear, and mute will be disabled when the correct password is entered.

Figure 2A:
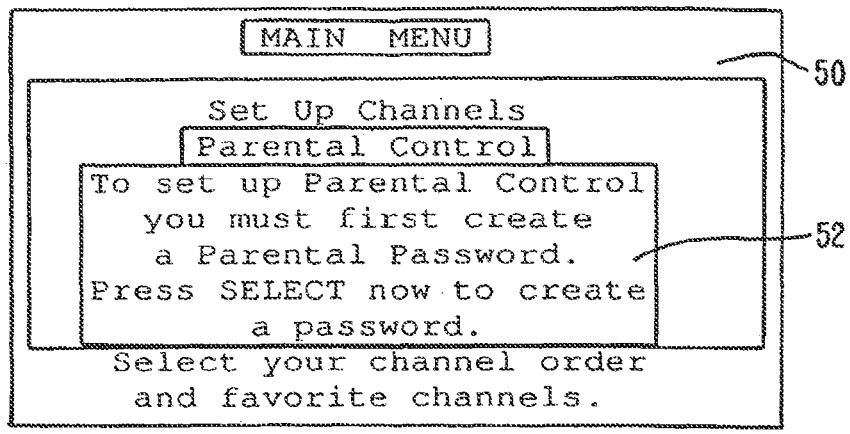
FIG. 2A shows a preferred embodiment of a pop-up menu shown to a user if a password has not been established, and the user selects parental control from the main menu of a television schedule guide.

FIG. 2A shows a preferred embodiment of pop-up 52 shown to a user if a password has not been established, and the user selects parental control from main menu 50. The various menus and pop-ups of the system may be shown as partial screens overlaying underlying full screens, or they may be shown as full screens. As shown, the user is asked to create a parental password by pressing a SELECT key. The SELECT key may also be the ENTER key, and may be on a user input device, or it may be located on the TV schedule guide and entered by directing a cursor to a screen button. If the SELECT key is on the TV schedule guide, a user may highlight it on the guide and input it by pressing an enter key, or any key that functions as an enter key on the user input device. Other keys that may be located on the user input device or the TV schedule guide include the CANCEL key, the REC key, and the EXIT key. Up, down, left and right arrow keys are preferably included to allow a user to navigate and make selections within the pop-up menus. However, any key combinations which allow a user to navigate within the pop-up menus may be used. The parental password may be established from main menu 50 by striking the SELECT key.

Figure 2B:
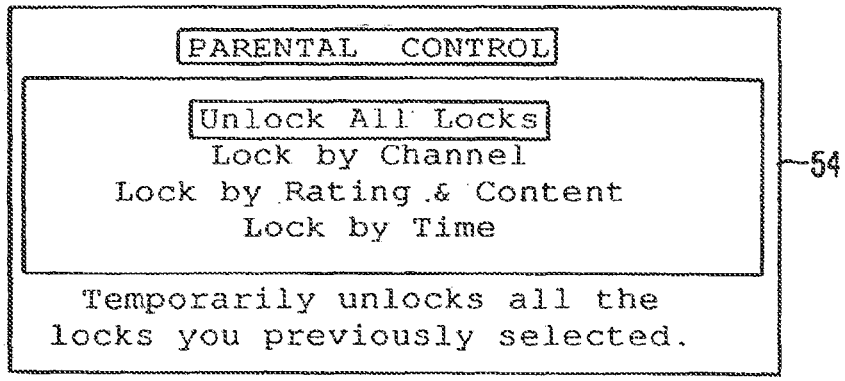
FIG. 2B shows a preferred embodiment of a parental control menu shown to a user after a parental password has been established and entered.

FIG. 2B shows a preferred embodiment of parental control menu 54 shown to a user when a parental password has been established, from main menu 50, and the user has entered the correct password. The user may lock TV programs by channel, by rating and/or content, or by time. If the user desires, for example, to lock by time, the user may move the cursor to the "Lock by Time" location and inputs the SELECT key. Alternatively, if programs have been locked, the user may unlock all programs that have been locked.

Figure 2C:
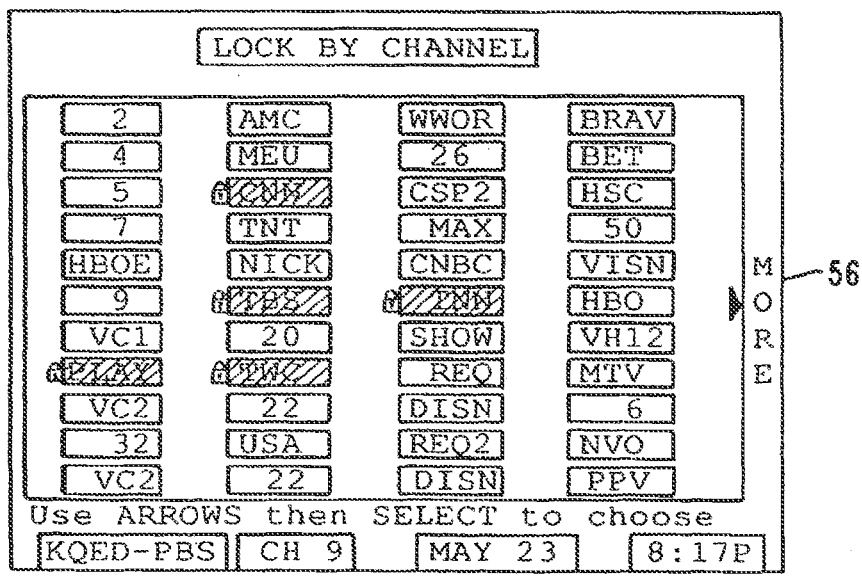
FIG. 2C shows a preferred embodiment of a pop-up shown when the user selects a "lock by channel" feature.

FIG. 2C is a preferred embodiment of pop-up 56 shown when the user selects the "lock by channel feature." In the preferred embodiment, pop-up 56 includes a list of all channels available to the user. If the user has more channels than will fit in pop-up 56, indicators or scroll bars will be shown at corners of the pop-up instructing the user to move further right or further down to display more channels. The user may use the previously mentioned arrow keys to navigate within pop-up 56. A channel is locked after a user highlights and selects the channel. A lock symbol will be placed next to the channel icon to indicate that the channel is locked. To unlock a channel, the user may highlight and select the locked channel. The lock symbol next to the channel icon will then disappear to indicate the lock is removed. The user may use the EXIT key to return to pop-up 54 of the parental control menu.

Since the system stores program information, it is able to determine whether a current or future program is shown on a restricted channel. The system may also determine whether a program falls within a restricted rating and/or content, V-chip classification, or time period. Hence, if a lock is placed on a channel on which there are programs scheduled for recording, a pop-up will appear warning the user of the conflict. If the user ignores the pop-up, it will time out in three seconds, the channel will be locked, and the recording will occur without the need for a password as it was set before the lock was enabled. Once a channel is locked, a user may not tune to, record, or purchase any program on that channel unless the user enters the correct password. However, upon entering the correct password, the user may schedule recording of future programs. At the time of the scheduled recording, the system unlocks the locked channel, tunes to the channel, and records the program. When the program is over, the system relocks the channel.

Figure 2D:
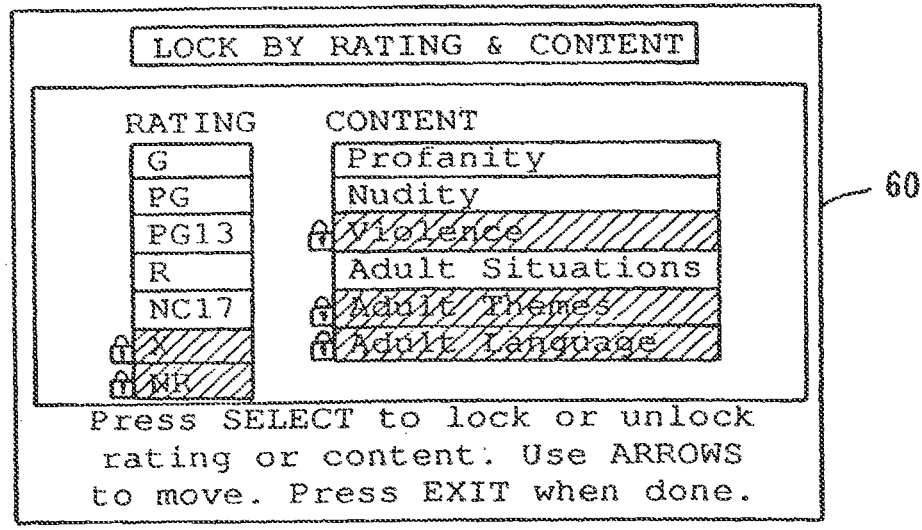
FIG. 2D shows a preferred embodiment of a pop-up shown when the user selects a "lock by rating and content" feature.

FIG. 2D is a preferred embodiment of pop-up 60 shown when the user elects to lock programs by rating and/or content. As can be seen, two lists are shown to the user, one by rating, and one by content. The user may lock by content and/or rating by highlighting the relevant content and/or rating on the pop-up and inputting the SELECT key. Programs may be locked using more than one category of rating and/or content. Furthermore, the content description on pop-up 60 may include information corresponding to data supplied by the V-chip. The V-chip data may be enclosed within parenthesis and will indicate the V-chip attribute classification of the program. For example, the content category "Violence" may have corresponding V-chip attribute mildly violent (V2), moderately violent (V3), and the like. When the user locks shows according to rating, all higher ratings are automatically locked. Since the show contents are not listed in order of severity, locking one content does not automatically lock any others.

Figure 2E:
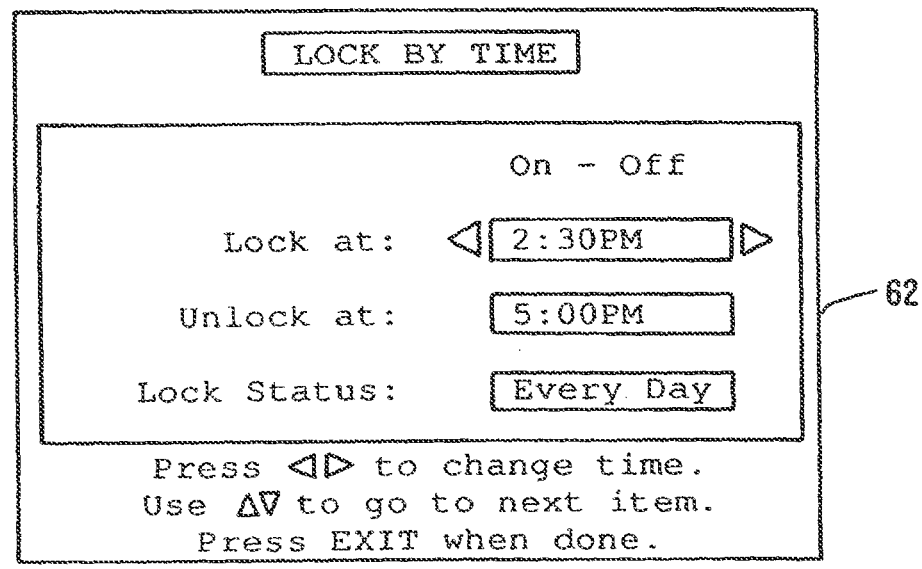
FIG. 2E shows a preferred embodiment of a pop-up shown when the user selects a "lock by time" feature.

The user may also lock specified time periods to prevent TV viewing during those times. The user may further specify the frequency of the lock, e.g., for a single day, for Monday through Friday only, weekends only, or for every day of the week. FIG. 2E shows pop-up 62, which requests user input for the time period during which TV viewing should be prevented. As shown, the user may specify the time to begin locking (the default time is 2:30 pm), the time to end locking (the default time is 5 pm), and the frequency of the lock (the default frequency is for a single day). In the situation where the user has set these values before, the system remembers the values and displays them when pop-up 62 is shown.

If TV viewing is attempted during a locked period, the system will mute the audio, and display a blue screen over video. A pop-up will appear asking for the parental password. When the correct password is entered, the solid blue screen will disappear, and audio will be re-enabled. If a lock is placed on a time period during which there are programs scheduled for recording, a pop-up will appear warning the user of the conflict. If the user ignores the pop-up, it will time out in three seconds, the channel will be locked, and the recording will occur without the requirement of a password as it was set before the lock was enabled. However, all future recordings scheduled during the locked period will require a password.

Figure 2F:
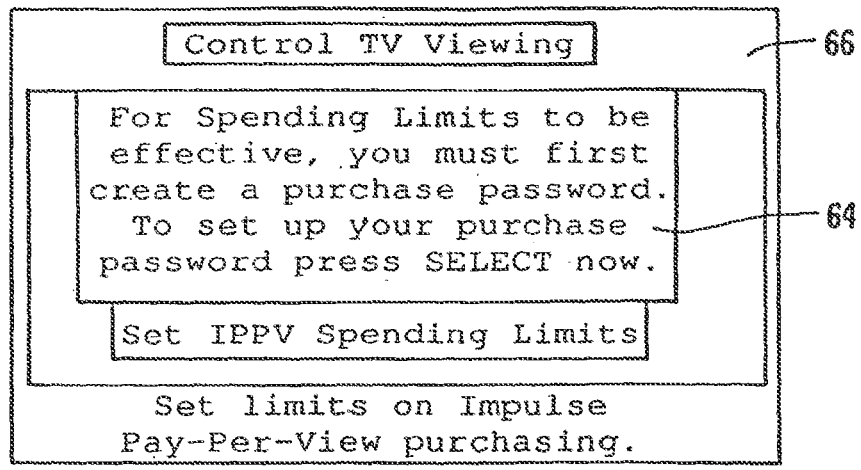
FIG. 2F shows a preferred embodiment of a pop-up shown to a user if a purchase password has not been established, and the user selects a "Set IPPV Spending limits" feature from the control viewing menu.
Figure 2G:
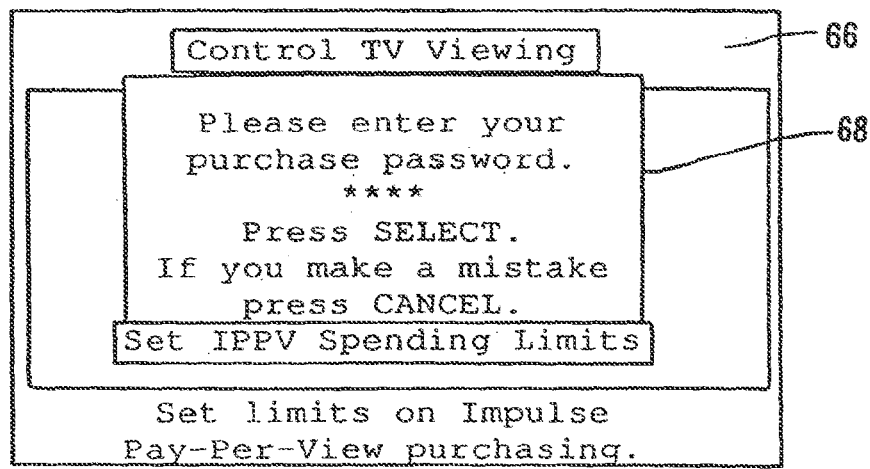
FIG. 2G shows a preferred embodiment of a pop-up shown to a user if a purchase password has been established, and the user selects the "Set IPPV Spending limits" feature from the control viewing menu.

FIG. 2F shows a preferred embodiment of pop-up 64 shown to a user if a purchase password has not been established, and the user selects the "Set IPPV Spending limits" feature from control viewing menu 66. IPPV stands for impulse pay-per-view, and refers to PPV programs which are purchased via a user input device, for example, a remote control. It is different from traditional PPV programs which require the user to call the program provider on a phone to purchase the program. The user may establish the purchase password, from main menu 50, by inputting the SELECT key either by pressing the key on the user input device, or selecting it on the TV schedule guide. FIG. 2G shows a preferred embodiment of pop-up 68 shown to a user if a purchase password has been established, and the user selects the "Set IPPV Spending limits" feature from control viewing menu 66. In this case, the user would simply enter the purchase password and input the SELECT key. As shown in FIG. 2G, if the user made a mistake, the user may input the CANCEL key and re-enter the password.

Figure 2H:
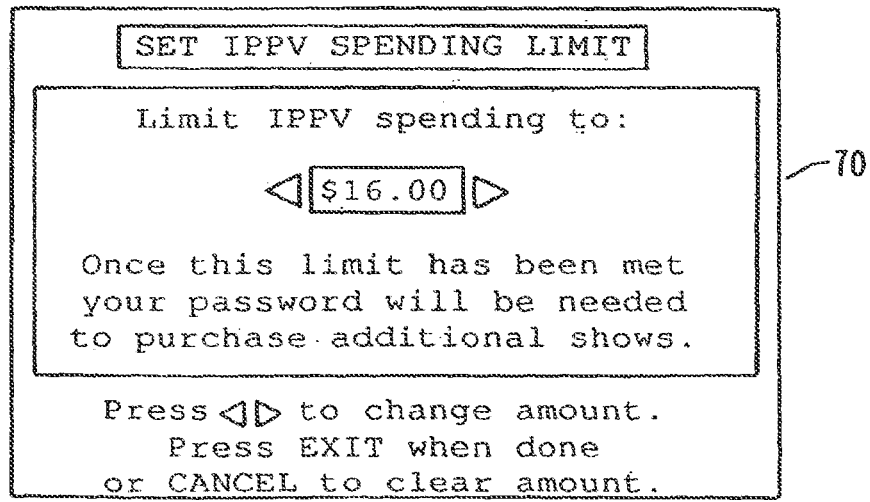
FIG. 2H shows a preferred embodiment of a IPPV spending limit pop-up shown to a user after a proper purchase password has been established and entered.

Once the purchase password has been established and entered, the user will see IPPV spending limit, pop-up 70 (as shown in FIG. 2H), and the user may enter the total dollar amount to which IPPV spending should be limited before the system requires a password to enable purchasing. The default spending amount is zero, in which case, the user needs to enter the purchase password for all purchases. Where a dollar amount greater than zero is set, this is the amount the user may spend before the purchase password is required to make additional purchases. To set the amount, the user may input the right arrow key, and with each input of the right arrow key, a dollar would be added to the limit. To decrease the amount, the user may use the left arrow key. The user may use the arrow keys to reset the dollar amount whenever desired.

To access a locked program, the user may select the "Unlock All Locks" feature from parental control menu 54, and all locked programs will be unlocked. Alternatively; the user may unlock all locks from the television schedule information guide by inputting the SELECT key for about 1 second while within the guide. A pop-up will appear, and the user may choose the "Unlock All" option. The system will ask the user for the parental password, and upon entering the correct password, the user may tune to all programs on all the available channels. While the programs are unlocked, the "Unlock All Locks" feature toggles and becomes the "Relock All Locks" feature and the gray lock symbols in the guides become red unlocked lock symbols. The user may relock all the previously locked programs by selecting "Relock All Locks" from parental control menu 54. Turning off the TV will also automatically restore all parental locks.

Alternatively, the user may unlock individual programs by tuning directly to the programs from either the TV or the TV schedule guide, and entering the correct password. If the user tunes to a locked channel, the system displays a blue screen over the TV screen, and mutes the audio. A pop-up will appear requesting the parental password. If the correct password is supplied, the system removes the blue screen and restores the audio. However, in this case, when the user tunes off a previously locked channel, the parental lock will be automatically restored. Hence, if the user tunes off the locked channel, and then tunes back, the user must re-enter the password to view the locked channel.

To access individual locked programs from the guide, the user may select whichever locked program the user wishes to view by highlighting it on the guide, and inputting the SELECT key. A password pop-up will appear. If the user enters the correct password, the system tunes to the channel with the desired program. The user may also input the SELECT key for more than 1 second, and a pop-up will appear asking the user whether to tune to or record the locked program. When the user has made a selection, the password pop-up will appear and the user may enter the password. After the correct password has been entered, the system will either tune to or record the locked program. Instead of inputting the SELECT key and selecting the record option on the pop-up, the user may also highlight a locked program and input the REC key to request recording of the program. Recording will proceed when the user has supplied the correct password.

Figure 3:
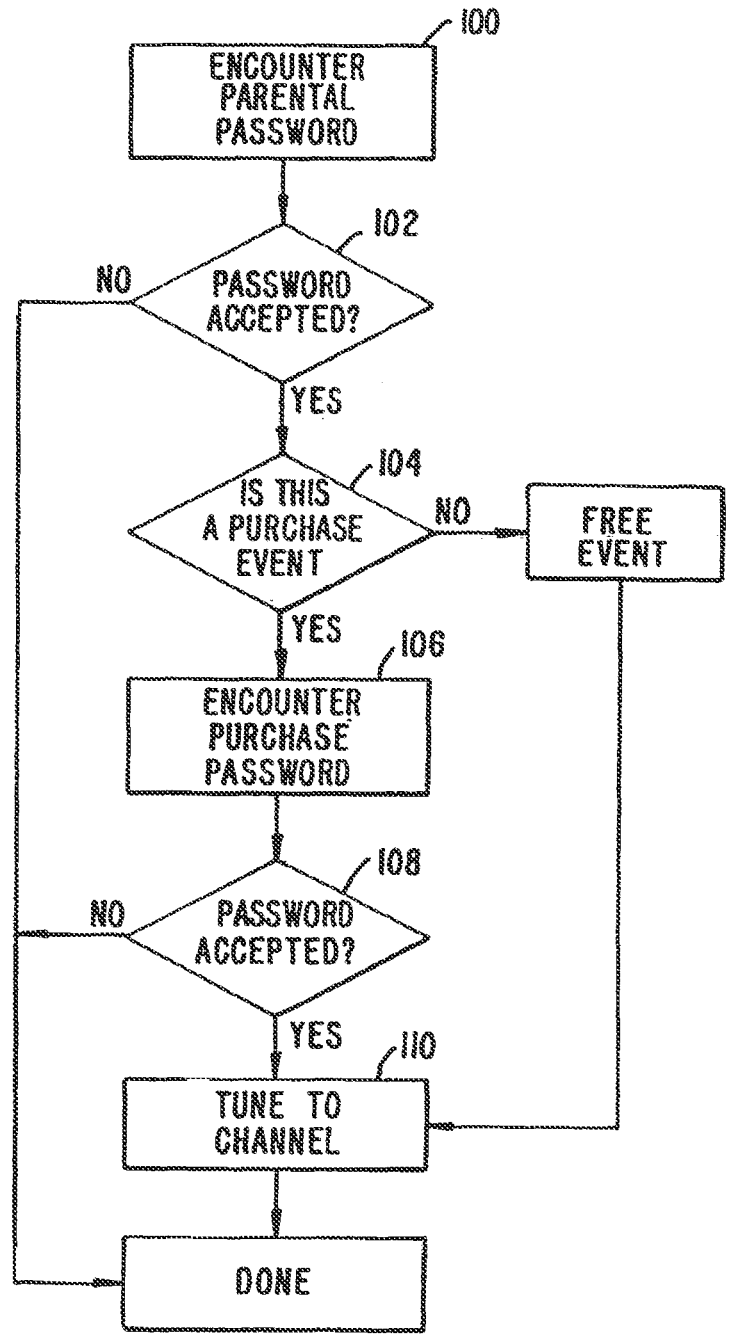
FIG. 3 is a process flow chart for determining whether a user could tune to a program.

FIG. 3 illustrates a process flow chart for determining whether a user could tune to a program. In preferred embodiments, the various processes described herein operate under software control, such software being stored on a computer readable storage medium. In a preferred embodiment, the system has checked whether a parental password is necessary at step 100. At step 102 the system determines whether the user has supplied the correct parental password. If the correct parental password has been entered, the process will check whether the program is a free event at step 104. A free event is a non pay-per-view event. If the event is free, the system will tune to the program at step 110. If the event is not free, the system will request that the user enter the purchase password at step 106. At step 108, the password entered is verified. If the password is correct, the system will tune to the program at step 110. For both verifying steps 102 and 108, if incorrect passwords are supplied, the system will not tune to the program requested.

Figure 4:
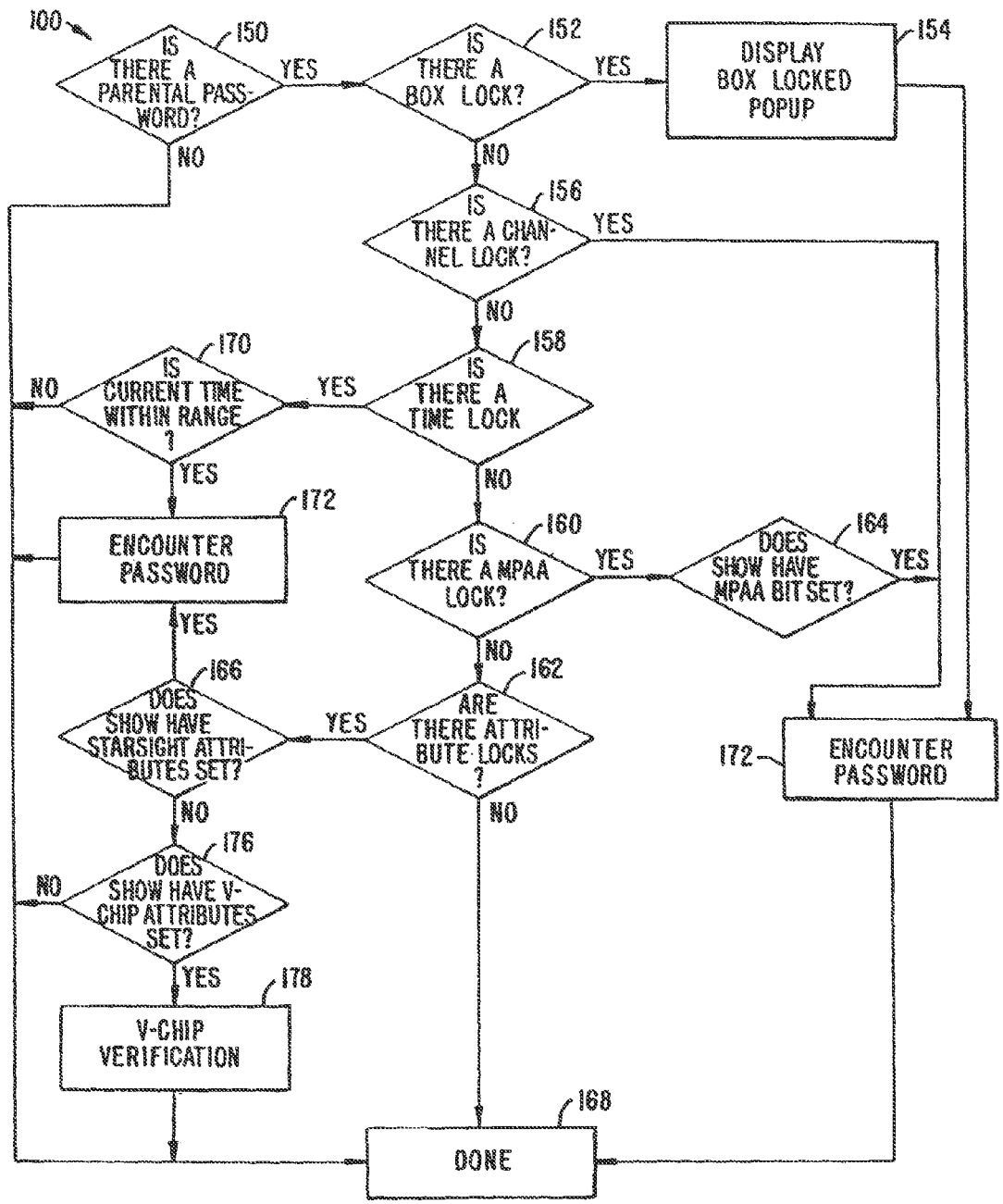
FIG. 4 is a process flow chart for the operation of the parental control feature.

FIG. 4 illustrates a process flow chart for the operation of the parental control feature. When a user turns on the TV, or tunes to a program or channel, the system checks at step 150 whether a parental password is needed before the program(s) will be shown. If a parental password exists, a step 152 of the system checks whether a BOX lock has been set. A BOX lock is essentially a special TIME lock as it keeps the TV locked for 24 hours a day, everyday. If a BOX lock exists, a step 154 displays a pop-up informing the viewer that a password is necessary before the viewer may watch TV, and a step 172 requests that the user enters the parental password. When the user supplies the correct password, the user may tune to the program, schedule an auto-tune, or schedule a recording of the program at step 168.

If a BOX lock has not been set, the system checks for channel locks at step 156. If none exists, a step 158 checks for a TIME lock. If a TIME lock exists, a step 170 checks whether the current time is within the range of the restricted times. The user is asked to supply the parental password at step 172 if the user is trying to watch TV at a restricted time. Similarly, if a channel lock exists, and the user is trying to tune to a locked channel, the user would be asked to supply the password at step 172. If the user is watching TV at an unrestricted time, the user may proceed to step 168 and may tune to the program, record the program and the like.

If no TIME lock has been set, a step 160 checks for a rating/MPAA lock, as the ratings correspond to those set by Motion Pictures of America Association. If a rating lock has been set, a step 164 determines whether the program has a restricted rating. If so, the user is asked to supply the parental password at step 172. On the other hand, if there is no rating lock, a step 162 checks for a content/ATTRIBUTE lock. The system checks at step 166 whether the program contains restricted content, and if so, the user is asked to supply the parental password at step 172. A step 176 further checks whether the program has a V-chip classification if the program does not contain restricted content. If so, a step 178 (details shown in FIG. 7) determines whether the user is trying to gain access to a program with restricted V-chip classifications.

Figure 5:
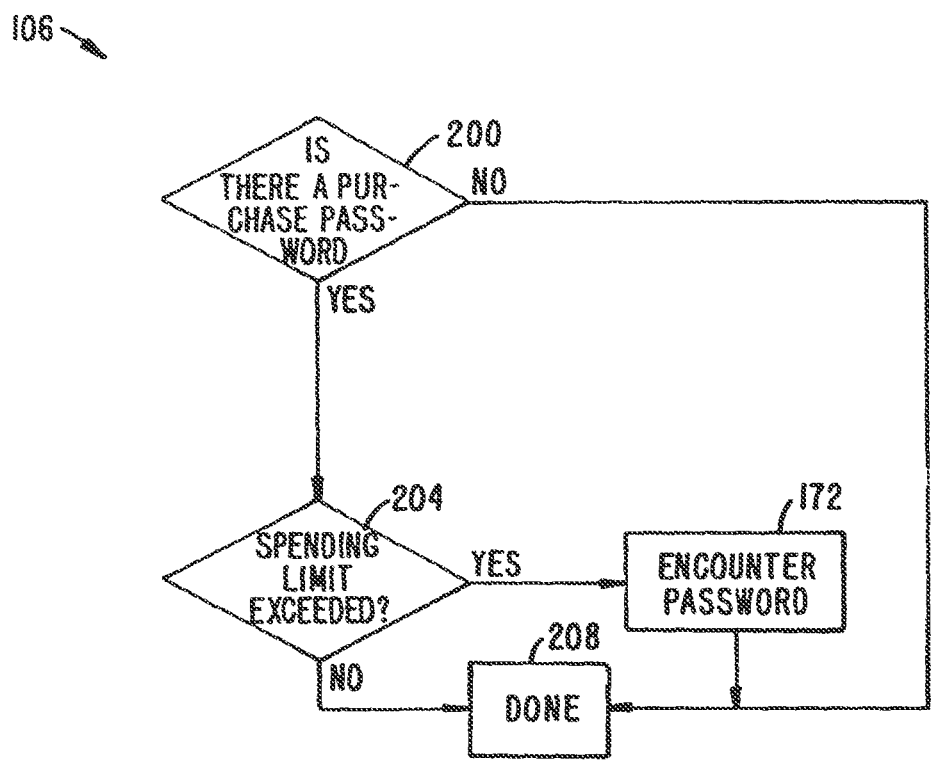
FIG. 5 is a process flow chart for the operation of the purchase control feature.

FIG. 5, which describes step 106 in greater detail, illustrates a process flow chart for the operation of the purchase control feature. When a user tunes to a program, a step 200 checks whether a purchase password has been established. If so, a step 204 checks whether the limit has been exceeded. Step 172 requests for the purchase password if the limit has been exceeded; if not, the system proceeds with the buying process at step 208. If step 200 determines that a purchase password has not been established, the system will also proceed with the buying process at step 208.

Figure 6:
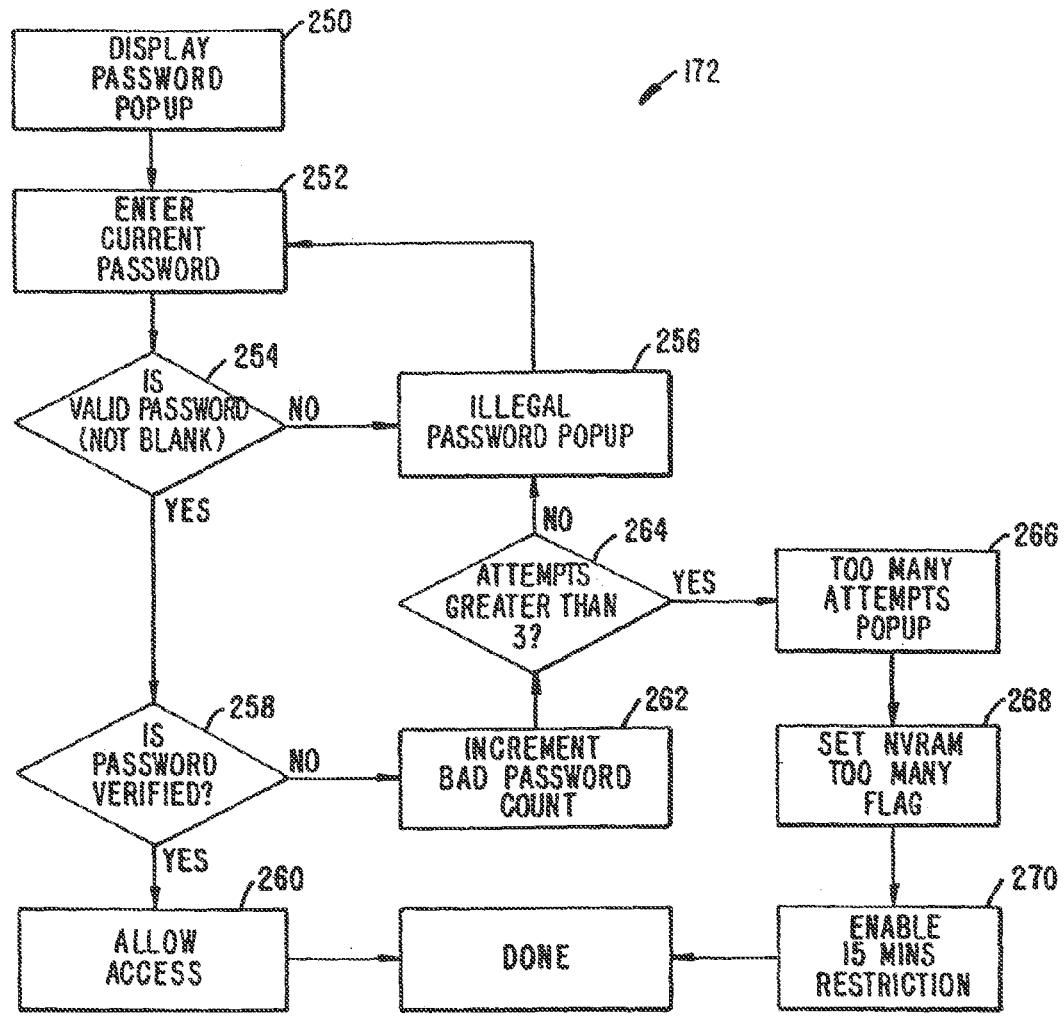
FIG. 6 is a process flow chart for verifying a password and limiting a user's number of tries in entering the parental control or purchase password.

FIG. 6, which describes step 172 in greater detail, illustrates a process flow chart for verifying a password and limiting a user's number of tries in entering the purchase or parental password. At step 250, the user is asked to supply the applicable password. A step 252 receives the user's input, and a step 254 checks whether the password is in a proper format. If the password is improper, for e.g., it has too many characters, a step 256 displays a message informing the user the password is illegal. Step 252 is repeated, and the user may re-enter a proper password. As shown, the user may re-enter the password an infinite number of times if the password is rejected as being improper.

Once the user has entered a proper password, a step 258 verifies that the password entered is correct. If so, a step 260 allows the user access to the locked program. However, when the password entered is incorrect, a step 262 tracks the number of times the user attempts to enter an incorrect password. A step 264 compares the count at 262 with the number 3. If the count at 262 is less than 3, a step 256 displays the illegal password pop-up and the user may re-enter the password at step 252. If the user has attempted to enter a correct password more than three times, a step 266 shows a pop-up informing the user there has been too many attempts to enter the password, and the user has to wait fifteen minutes before attempting to enter the password again. Steps 268 and 270 set the Flag, and start the fifteen minute restriction before allowing the user to re-enter a password.

Figure 7:
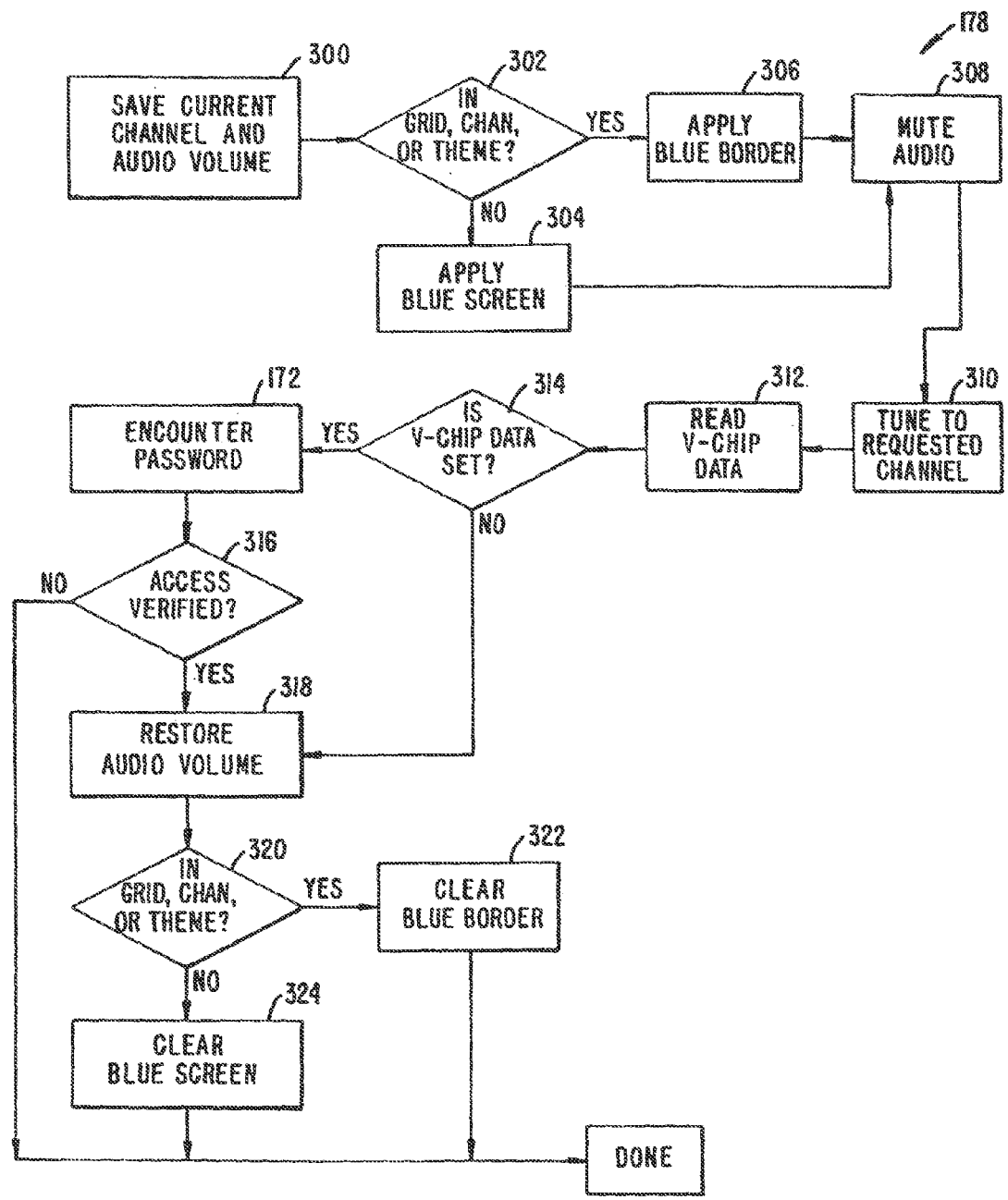
FIG. 7 is a process flow chart for determining whether a program has a restricted V-chip classification, and whether access should be allowed.

In a preferred embodiment, disconnecting the system from the power supply will not circumvent the fifteen minute restriction; instead, the user will have to wait longer to re-enter the password as the system resets the fifteen minute period when it is re-connected to the power supply. The system restricts the user to three attempts at entering the correct password to ensure the security of the password. Since an unauthorized user will preferably have to wait at least 15 minutes after every three tries, the unauthorized user is not as likely to crack the password. FIG. 7, which describes step 178 in greater detail, illustrates a process flow chart for determining whether a program has restricted V-chip classification, and whether the user should be allowed access. Since V-chip data comes from the video stream of a channel, one way to determine whether a program has restricted V-chip classification is to first tune to the channel to access the data. For example, the user may be watching channel 9, and desires to tune to channel 3. Referring to FIG. 7, if the system determines that the program on channel 3 has V-chip classification, a step 300 saves the video and audio volume information of channel 9. The system determines at step 302 whether the user is changing channels from the TV screen or from within guide. If the user is changing channels from the TV screen, a step 304 puts a blue screen over the TV screen.

Alternatively, where the user is changing channels from within the guide, a step 306 applies a blue border around the guide to block out parts of the screen that are not covered by the guide. At step 308, the system mutes the audio so the user may not hear the program. A step 310 tunes to the requested channel, which is channel 3 in this example, and a step 312 reads the V-chip data from the video stream of the channel. A step 314 determines whether the V-chip classification is a restricted classification. If not, the user may tune to the program on channel 3. However if the program has a restricted V-chip classification, the user is asked to supply the parental password at step 172. A step 316 checks that the user has supplied the correct parental password, if so, a step 318 restores the audio volume of the channel (in this case, channel 3). Depending on whether the user was chancing channels while within the TV screen or the guide, either step 324 will remove the blue screen put on by step 304, or a step 322 will clear the guide and the blue border applied by step 306. If access was not verified at step 316, audio remains muted, and the blue screen or the blue border and the guide remains on the screen. The user may, however, attempt to access other channels/programs, which will be shown if they are unrestricted.

In another embodiment, the system need not first tune to the channel to access V-chip data. Since V-chip rating data may be included in the data stream, and received in a similar manner as data regarding program title, description, and the like, the system may receive the V-chip rating data in advance, and store the data in a database. In this embodiment, the system may apply parental control without having to first tune to the channel to access V-Chip data, as the system may simply retrieve the data from the database. Referring to the FIG. 7 example, the system may determine, while the user is still within channel 9, whether the program on channel 3 has V-chip classification by retrieving V-chip data information regarding the channel 3 program from the database. After retrieving this information, if the program has V-chip classification, the system may determine whether the V-chip classification is a restricted classification. If so, the parental password is requested, if not, the system tunes to the channel 3 program. Hence, this embodiment eliminates the need for the system to mute the audio and put up a blue screen or a blue border around the guide, as the system need not first tune to the channel.

Figure 8:
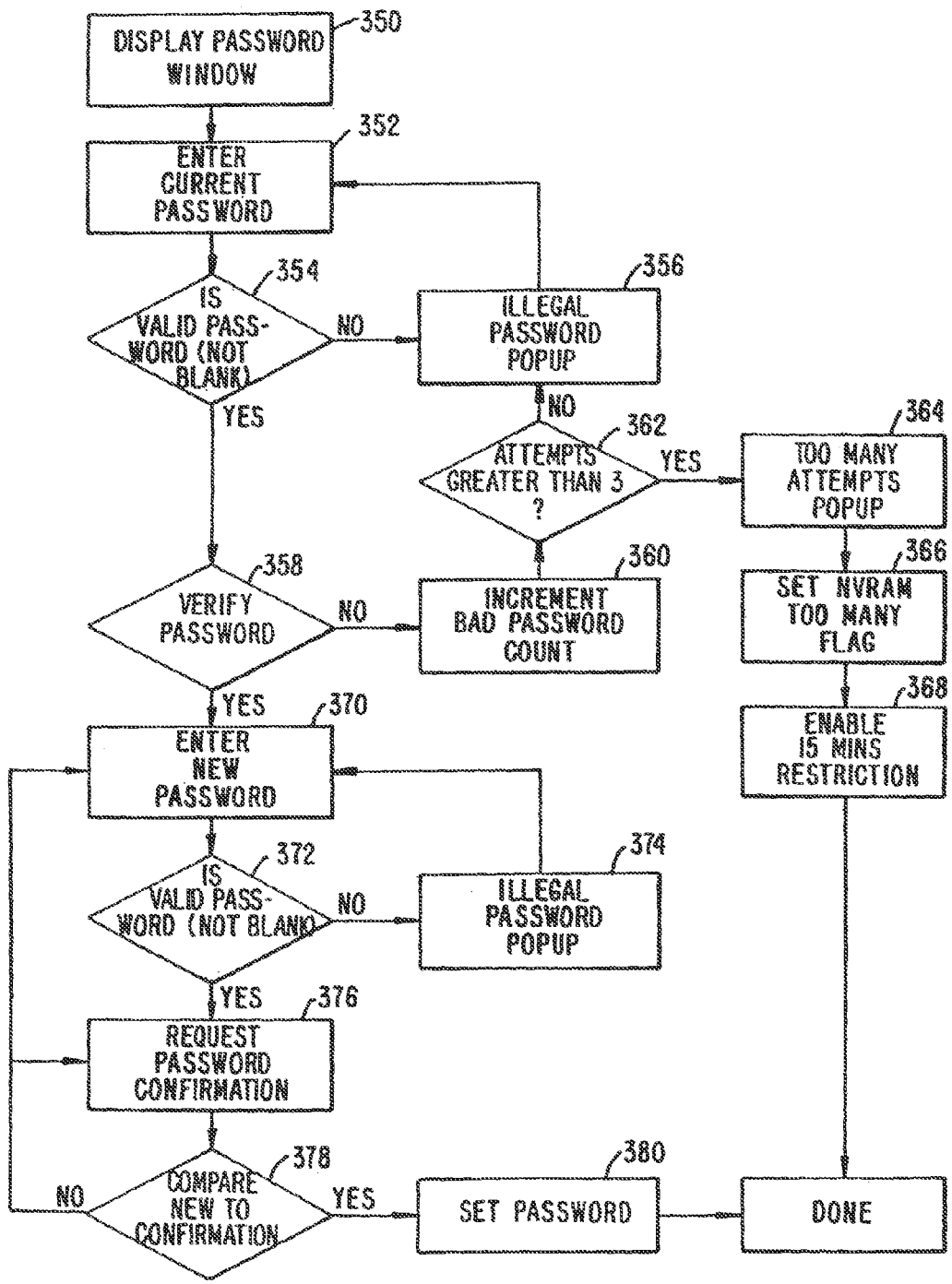
FIG. 8 is a process flow chart for changing the parental control or purchase password.

FIG. 8 illustrates a process flow chart for changing the parental control or purchase password. A step 350 requests for the password, and a step 352 receives the user password input. A step 354 checks whether the password is in proper form, if not, a step 356 displays an illegal password pop-up, and the user has an unlimited number of times to re-enter a proper password at step 352. When the password entered is in proper form, a step 358 verifies that the password is in fact the correct password. A step 360 keeps count of the number of times an incorrect password is entered. As shown by steps 360 and 362, the user is given three attempts to enter a correct password. If after three attempts, the password entered is still incorrect, a step 364 displays a "Too Many Attempts" pop-up. The user has to wait fifteen minutes before the system will allow any further password input attempts, as steps 366 and 368 set the flag and start the fifteen minute restriction. As mentioned, the user preferably may not circumvent the fifteen minute wait by disconnecting the system from the power supply.

The user is allowed to change the old password and enter a new password at step 370 if the user supplied the correct password at step 352. A step 372 ensures that the new password is in proper form, if not, a step 374 displays an illegal password pop-up, and the user has an unlimited number of times to re-enter a proper new password at step 370. If the new password entered is in proper form, the user is requested to re-enter the new password at step 376 to confirm the new password entered is indeed the password desired. At step 378, the system compares the password entered at step 370 with the password entered at step 376. If the two passwords are different, the user is asked to re-enter the new password again at step 376 to confirm the new password entered is the password desired, and step 378 again compares the passwords entered.

Steps 376 and 378 are repeated until the password entered at step 376 matches the password entered at step 370. Or, the user may exit the process, in which case, the password is unchanged. Alternatively, after step 378 made its comparison, if password 370 is different from password 376, steps 370-378 are repeated. This means that the user may re-enter the new password at step 370 to ensure that the entry at step 370 is correct, and reconfirm the password at step 376. Step 378 will compare the two passwords, if they are the same, a step 380 changes the old password to the new password.

Figure 9:
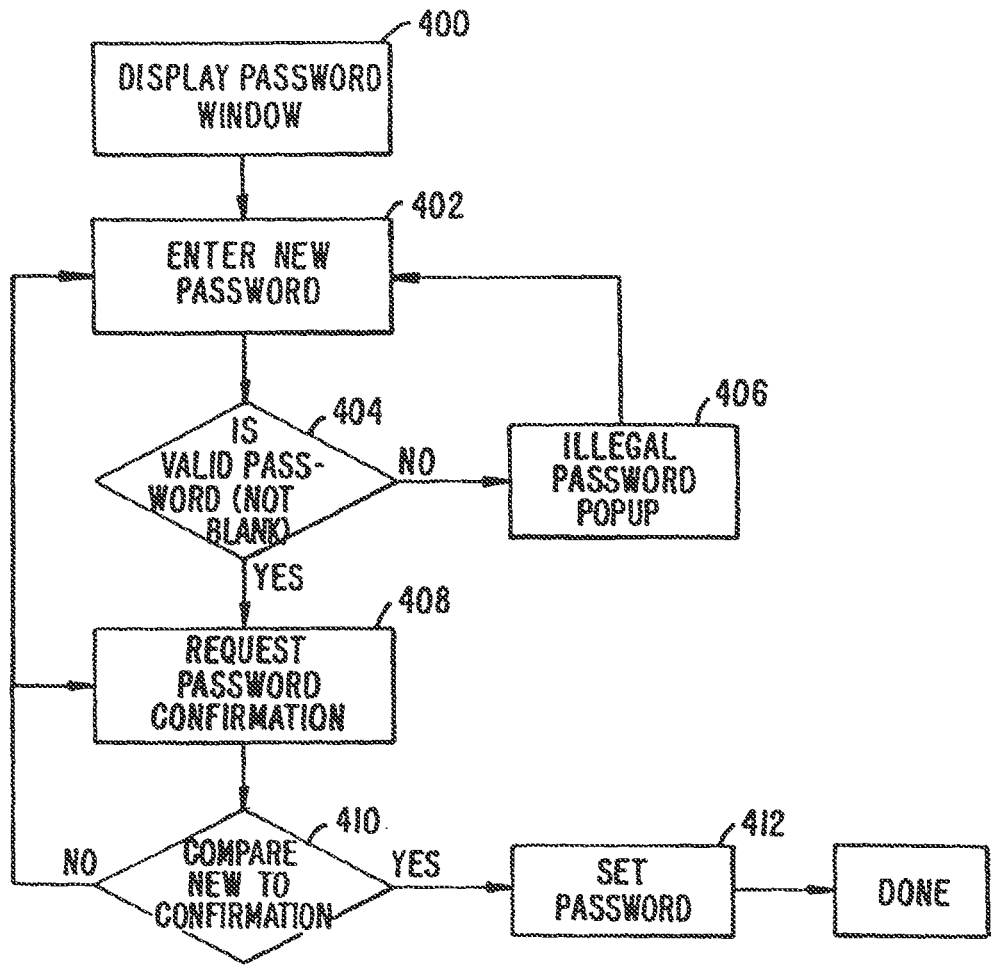
FIG. 9 is a process flow chart for establishing the parental control or purchase password.

FIG. 9 illustrates a process flow chart for establishing the parental control or purchase password. A step 400 requests for the password, and a step 402 receives the user password input. At step 404, the system checks whether the password is in proper form, if not, a step 406 displays an illegal password pop-up, and the user has an unlimited number of times to re-enter a proper password at step 402. If the password entered is in proper form, the user is requested to re-enter the password at step 408 to confirm the password entered is indeed the password desired. A step 410 compares the password entered at step 402 with the password entered at step 408. If the two passwords are different, the user is asked to re-enter the password again at step 408 to confirm the password entered is the password desired, and step 410 again compares the passwords entered.

Steps 408 and 410 are repeated until the password entered at step 408 matches the password entered at step 402. Or, the user may exit the process, in which case, a password is not created. Alternatively, after step 410 made its comparison, if password 402 is different from password 408, steps 402-410 are repeated. This means that the user may re-enter the password at step 402 to ensure that the entry at step 402 is correct, and re-confirm the password at step 408. A step 410 will compare the two passwords. If they are the same, a step 412 establishes the password as the current password.

Figure 10:
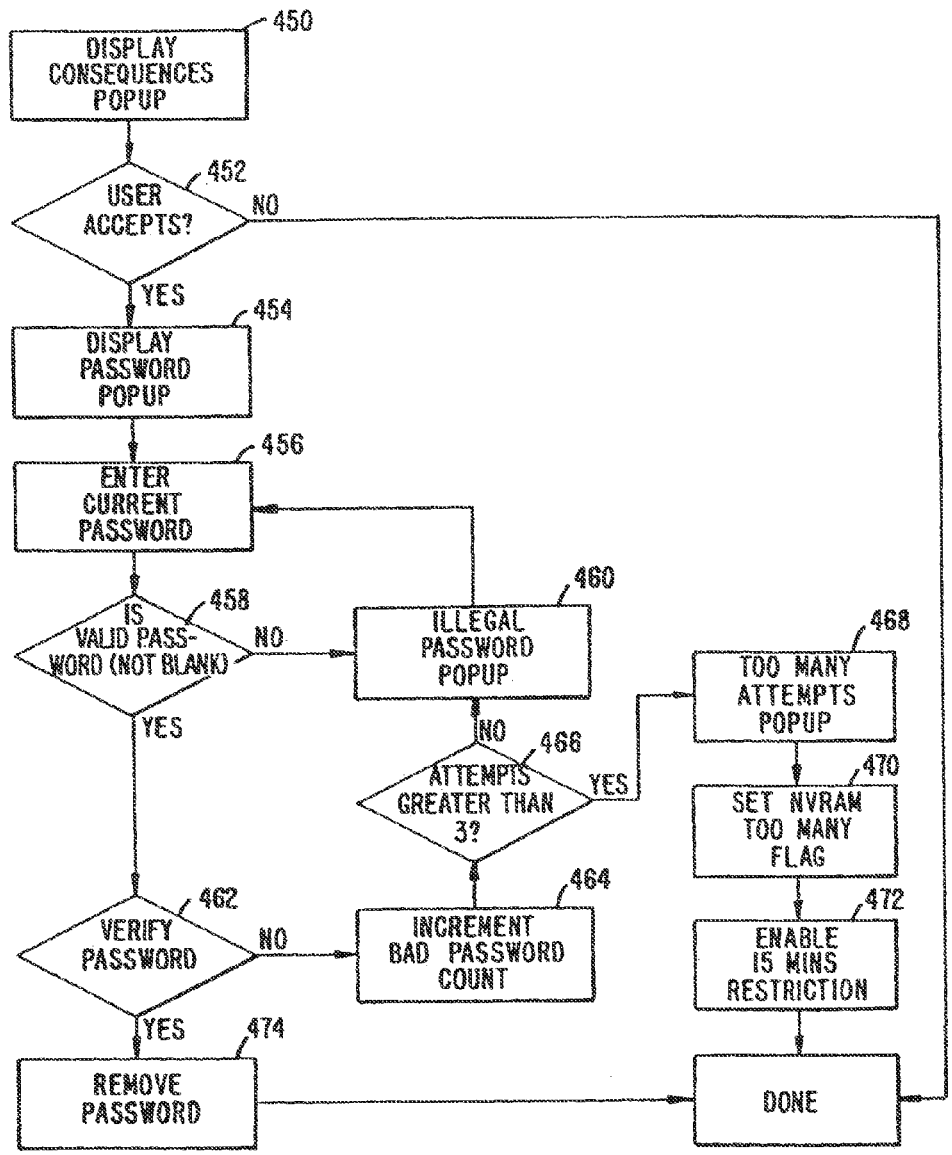
FIG. 10 is a process flow chart for removing the parental control or purchase password.

FIG. 10 illustrates a process flow chart for removing the parental control or purchase password. At step 450, the system displays a pop-up explaining to the user that all programs may be viewed free of restrictions if the user removes the password and asks whether the user wishes to proceed. If the user decides to proceed at step 452, a step 454 requests that the user enters the password. If not, the user exits the process. A step 456 receives the user input if the user decides to proceed, and a step 458 checks whether the password is in proper form. If not, a step 460 displays an illegal password pop-up, and the user has an unlimited number of times to re-enter a proper password at step 456. If the password entered is in proper form, a step 462 verifies that the password is in fact the correct password. A step 464 keeps count of the number of times an incorrect password is entered.

As shown by steps 466, 460 and 456, the user is given three attempts to enter a correct password. After three attempts, if the password entered is still incorrect, step 468 displays a "Too Many Attempts" pop-up. The user has to wait fifteen minutes before the system will allow any further password input attempts, as steps 470 and 472 set the flag and start the fifteen minute restriction. As mentioned, the user preferably may not circumvent the fifteen minute wait by disconnecting the system from the power supply. The user is allowed to remove the password at step 474 if the user supplied the correct password at step 462.

The above description is illustrative and not restrictive. Variations of the invention will become apparent to those skilled in the art upon review of this disclosure. The scope of the invention should, therefore, be determined not with reference to the above description, but instead should be determined with reference to the appended claims along with their full scope of equivalents.

What is claimed is:

1. A method of limiting a number of times viewers must enter passwords when applying parental controls that control access to television programs, the method comprising:
   receiving, via a data stream, television schedule information for a plurality of television programs;
   generating for display, on a television, television program listings based on the television schedule information for the plurality of television programs;
   receiving, via an input device, a viewer request to schedule a television program for automatic, unattended recording, wherein the television program is scheduled for transmission on a channel;
   after receiving the viewer request to schedule the television program for automatic, unattended recording, receiving, via the input device, a viewer request to block the channel;
   in response to receiving the viewer request to block the channel, storing a record of a block on the channel;
   without further user input, comparing the record to television schedule information for the television program to determine that the channel on which the television program is scheduled for automatic, unattended recording is blocked; and
   without requiring a viewer to enter a password to confirm the automatic, unattended recording of the television program, not blocking the scheduled recording of the television program.

2. A non-transitory computer-readable medium comprising instructions recorded thereon for limiting a number of times viewers must enter passwords when applying parental controls that control access to television programs, the instructions comprising:
- an instruction for receiving, via a data stream, television schedule information for a plurality of television programs;
- an instruction for generating for display, on a television, television program listings based on the television schedule information for the plurality of television programs;
- an instruction for receiving, via an input device, a viewer request to schedule a television program for automatic, unattended recording, wherein the television program is scheduled for transmission on a channel;
- an instruction for receiving, via the input device, a viewer request to block the channel after receiving the viewer request to schedule the television program for automatic, unattended recording;
- an instruction for storing a record of a block on the channel in response to receiving the viewer request to block the channel;
- an instruction for comparing, without viewer input, the record to television schedule information for the television program to determine that the channel on which the television program is scheduled for automatic, unattended recording is blocked; and
- an instruction for not blocking the scheduled recording of the television program without requiring a viewer to enter a password to confirm the automatic, unattended recording of the television program.

3. A system for limiting a number of times viewers must enter passwords when applying parental controls that control access to television programs, the system comprising:
- memory configured to store records of blocks on channels; and
- a processor configured to:
  - receive, via a data stream, television schedule information for a plurality of television programs;
  - generate for display, on a television, television program listings based on the television schedule information for the plurality of television programs;
  - receive, via an input device, a viewer request to schedule a television program for automatic, unattended recording, wherein the television program is scheduled for transmission on a channel;
  - receive, via the input device, a viewer request to block the channel after receiving the viewer request to schedule the television program for automatic, unattended recording;
  - storing, in the memory, a record of a block on the channel in response to receiving the viewer request to block the channel;
  - compare, without further user input, the record to television schedule information for the television program to determine that the channel on which the television program is scheduled for automatic, unattended recording is blocked; and
  - not block the scheduled recording of the television program without requiring a viewer to enter a password to confirm the automatic, unattended recording of the television program.

4. The method of claim 1, further comprising generating for display a warning, wherein the warning warns the viewer that the channel on which the television program is scheduled for automatic, unattended recording is blocked.

5. The method of claim 1, further comprising:
- receiving a viewer request to view the recording of the television program; and
- prompting the viewer to enter the password in response to receiving the viewer request to view the recording of the television program.

6. The method of claim 1, further comprising receiving a viewer input establishing the password.

7. The method of claim 1, further comprising:
- receiving a viewer request to schedule a different television program for automatic, unattended recording on the channel after the viewer request to block the channel;
- requiring the viewer to enter the password to confirm the automatic, unattended recording of the different television program; and
- denying the viewer request to schedule the different television program for automatic, unattended recording if the password is not entered.

8. The non-transitory computer-readable medium of claim 2, further comprising an instruction for generating for display a warning, wherein the warning warns the viewer that the channel on which the television program is scheduled for automatic, unattended recording is blocked.

9. The non-transitory computer-readable medium of claim 2, further comprising:
- an instruction for receiving a viewer request to view the recording of the television program; and
- an instruction for prompting the viewer to enter the password in response to receiving the viewer request to view the recording of the television program.

10. The non-transitory computer-readable medium of claim 2, further comprising an instruction for receiving a viewer input establishing the password.

11. The non-transitory computer-readable medium of claim 2, further comprising:
- an instruction for receiving a viewer request to schedule a different television program for automatic, unattended recording on the channel after the viewer request to block the channel;
- an instruction for requiring the viewer to enter the password to confirm the automatic, unattended recording of the different television program; and
- an instruction for denying the viewer request to schedule the different television program for automatic, unattended recording if the password is not entered.

12. The system of claim 3, wherein the processor is further configured to generate for display a warning, wherein the warning warns the viewer that the channel on which the television program is scheduled for automatic, unattended recording is blocked.

13. The system of claim 3, wherein the processor is further configured to:
- receive a viewer request to view the recording of the television program; and
- prompt the viewer to enter the password in response to receiving the viewer request to view the recording of the television program.

14. The system of claim 3, wherein the processor is further configured to receive a viewer input establishing the password.

15. The system of claim 3, wherein the processor is further configured to:
- receive a viewer request to schedule a different television program for automatic, unattended recording on the channel after the viewer request to block the channel;

require the viewer to enter the password to confirm the automatic, unattended recording of the different television program; and deny the viewer request to schedule the different television program for automatic, unattended recording if the password is not entered.

\* \* \* \* \*